United States Patent [19]
Harres

[11] Patent Number: 5,694,231
[45] Date of Patent: Dec. 2, 1997

[54] WEIGHTED-SUM PROCESSING METHOD AND APPARATUS FOR DECODING OPTICAL SIGNALS

[75] Inventor: Daniel N. Harres, Belleville, Ill.

[73] Assignee: McDonnell Douglas Corporation, St. Louis, Mo.

[21] Appl. No.: 702,764

[22] Filed: Aug. 22, 1996

[51] Int. Cl.$^6$ .................... H04B 10/08; H04B 10/06
[52] U.S. Cl. .................. 359/110; 359/161; 359/189; 375/333; 341/70; 371/6
[58] Field of Search .................... 359/161, 110, 359/175, 189, 183; 375/324, 330, 333; 341/70; 371/6

[56] References Cited

U.S. PATENT DOCUMENTS

| | | | |
|---|---|---|---|
| 3,349,371 | 10/1967 | Brothman et al. | 371/6 |
| 4,257,125 | 3/1981 | Theall, Jr. | 359/194 |
| 4,302,845 | 11/1981 | McClaughry et al. | 375/328 |
| 4,581,750 | 4/1986 | Dieleman | 375/333 |
| 4,606,052 | 8/1986 | Hirtzel et al. | 375/333 |
| 5,081,644 | 1/1992 | Uchida et al. | 375/1 |
| 5,170,396 | 12/1992 | Rivers et al. | 371/6 |
| 5,175,507 | 12/1992 | Roither | 329/304 |
| 5,574,587 | 11/1996 | Krökel et al. | 359/161 |

Primary Examiner—Kinfe-Michael Negash
Attorney, Agent, or Firm—Bell Seltzer Intellectual Property Group of Alston & Bird LLC

[57] ABSTRACT

The method and associated apparatus of the present invention decodes optical signals by appropriately weighting the respective noise portions of the two phase segments generated by the photodetector, such as an APD, such that the optical signal can be reliably decoded. The photodetector detects an optical signal having a light portion and a dark portion. The photodetector then generates an electrical pulse in response to the optical signal. The electrical pulse has two phase segments, namely, one phase segment corresponding to the light portion of the optical signal and another phase segment corresponding to the dark portion of the optical signal. Each phase segment also includes a respective noise portion. The optical decoding method and apparatus determines a weighting factor based upon the respective noise portions of the two phase segments. Thereafter, at least one phase segment is weighted by the weighting factor. For example, the noisier phase segment can be attenuated by the weighting factor. A decoder can then identify the logic level of the optical signal based upon the two phase segments as weighted by the weighting factor.

19 Claims, 2 Drawing Sheets

WEIGHTED-SUM PROCESSING METHOD AND APPARATUS FOR DECODING OPTICAL SIGNALS

FIELD OF THE INVENTION

The present invention relates to the detection and decoding of optical signals and, more particularly, to the detection and decoding of optical signals with a photodetector which introduces various noise components.

BACKGROUND OF THE INVENTION

High speed data transmission and optical communication is conventionally accomplished by transmitting optical pulses from a transmitter or one or more intermediate relay stations to an optical detector. The optical pulses are typically formatted according to a predetermined communications standard which assigns the pulse patterns which define a logic "0" and a logic "1". One well known standard is the "Manchester" coding technique which assigns a logic "1" to an optical pulse characterized by a negative going transition at the mid-bit position and a logic "0" to an optical pulse characterized by a positive going transition at the mid-bit position of the encoded signal. Thus, each Manchester encoded signal has two phase or pulse segments with equal, but opposite polarities.

Regardless of the communication standard, the optical signals must be properly detected and decoded. The receivers of conventional high performance optical communications systems include Avalanche Photodiodes ("APD's") to detect low-level optical signals. In operation, an APD serves as a trigger or switch which is activated to generate an electrical pulse when exposed to light. Thus, an APD converts the optical signal to a corresponding electrical signal.

The electrical pulse generated by an APD includes not only a signal portion produced as a result of the received light signal, but also a noise portion. During the phase segment of electrical pulse attributable to the illumination of the APD, the electrical signal includes a greater percentage of noise including, among other noise components, signal shot noise. As known to those skilled in the art, the signal shot noise of an APD increases as the gain of the APD is increased. Thus, the signal shot noise generated by an APD which provides a relatively high gain may become a significant part of the resulting electrical signal. See, for example, S. M. Sze, *Semiconductor Devices Physics and Technology*, p. 286 (1985).

In order to properly decode the signal, i.e., to properly identify the data bit as a logic "1" or a logic "0", it is important to identify which phase segment of the resulting electrical signal has the positive polarity and which phase segment has the negative polarity. As the noise components of the electrical signals increase, however, it becomes increasingly difficult to correctly identify the respective polarities of the phase segments and, as a result, increasingly difficult, if not impossible, to identify the respective data bit.

Conventionally, optical decoders have separately integrated the two phase segments in an attempt to decode the optical signal. For example, conventional optical decoders independently sum samples taken in the first phase segment and the second phase segment. By averaging the summed samples and comparing these average values, these conventional optical decoders can generally determine if the data bit is a logic "1" or a logic "0". Primarily because of the signal shot noise present in the illuminated phase segment of the electrical pulse, however, conventional optical decoders may sometimes incorrectly identify the logic level of the data bit since the noise and, in particular, the signal shot noise can deceive the optical decoder and skew the results.

In order to detect relatively low level optical signals, an APD must generally provide a relatively high gain, such as a gain of 200. However, conventional optical communication systems are somewhat restrained from increasing the gain provided by the APD since the resulting optical signals provided by the APD will also include significantly larger noise components. Specifically, the increased signal shot noise generated by APD's having relatively high levels of gain effectively limits the gain which can be provided by a conventional APD without excessively increasing the bit error rate (BER).

A wide variety of optical signal detection techniques have been proposed. For example, U.S. Pat. No. 3,349,371 which issued to Brothman et al. and is entitled *Quaternary Decision Logic* proposes to distinguish between a binary "1" and a binary "0" by classifying the signal in one of four categories. This technique proposes to adjust system parameters, such as to increase or decrease the total transmitted energy, based on ambiguous signal recognition. However, Brothman et al. is relatively complex and can be computationally intensive since it measures noise over a long period of time. In addition, Brothman et al. does not address the resolution problems associated with the signal shot noise of an APD.

In addition, U.S. Pat. No. 5,175,507 which issued to Roither and is entitled *Method Of and Device For Demodulating Biphase Modulated Signal* describes a demodulation method which employs a reference phase angle level to determine and assign a binary value to a detected signal. However, Roiter does not measure noise and also does not address resolution problems associated with increased noise levels.

OBJECTS AND SUMMARY OF THE INVENTION

It is thereafter an object of the present invention to provide a more reliable method and apparatus for detecting and decoding optical signals.

It is a further object of the invention to provide a method and apparatus for reliably detecting low level signals by increasing the gain of the detection while simultaneously decreasing the bit error rate.

These and other objects are provided, according to the present invention, by a method and associated apparatus for decoding an optical signal which appropriately weights the respective noise portions of the two phase segments generated by the photodetector, such as an APD, such that the optical signal can be reliably decoded. In operation, the photodetector detects an optical signal having a light portion and a dark portion. The photodetector then generates an electrical pulse in response to the optical signal. The electrical pulse has two phase segments, namely, one segment corresponding to the light portion of the optical signal and another phase segment corresponding to the dark portion of the optical signal. Each phase segment includes respective signal and noise portions. According to the present invention, a signal weighting factor is determined, such as by a signal weighting factor determining means, based upon the respective noise portions of the two-phase segments. Thereafter, at least one phase segment is weighted by the signal weighting factor. A decoder can then identify the optical signal based upon the first and second phase segments as weighted by the signal weighting factor.

The signal weighting factor determining means preferably includes power determining means for determining the power of the respective noise portions of the two phase segments. Based upon the power of the respective noise portions, the signal weighting factor can be determined such that the multiplicative product of the signal weighting factor and the power of the noise portion of one phase segment equals the power of the noise portion of the other phase segment. Alternatively, the signal weighting factor can be determined by the ratio of the power of the noise portion of one phase segment to the power of the noise portion of the other phase noise segment. Typically, the weighting factor is between 0 and 1 such that the phase segment which has the noise portion with the greatest power is attenuated by the signal weighting factor.

Once properly weighted, the decoder can properly identify the optical signal by summing the two phase segments, such as with a summer, to produce a weighted sum having a respective polarity. The optical signal can then be identified based upon the polarity of the weighted sum. By weighting at least one of the phase segments based upon the power of the noise portions of the respective phase segments, the decoding method and apparatus of the present invention can reliably detect and decode optical signals. In particular, the decoding method and apparatus of the present invention can reliably decode optical signals even as the gain provided by the photodetector, such as the gain provided by the APD, is increased, thereby allowing optical signals having lower power levels to be reliably detected and decoded.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Generally described, an encoded optical signal is synchronized and transmitted in bit format along a transmission path. According to many conventional bit formats, such as the Manchester format, each bit includes two phase segments. One phase segment corresponds to the portion of the signal during which the light is "on" and the other phase segment corresponds to the portion of the signal during which the light is "off".

An optical communications system 10 generally includes an optical decoder including a receiver, such as a photodetector 50. One advantageous type of photodetector, particularly for detecting low level optical signals, is an APD. However, the photodetector can be of other types, such as PIN photodiodes, photomultiplier tubes and the like, without departing from the spirit and scope of the present invention. Of course, PIN photodiodes do not have the flexible gain attributes associated with an APD. Nonetheless, the optical decoding method and apparatus of the present invention can include PIN photodiodes since signal shot noise affects these devices in much the same way as an APD.

Figure 1:
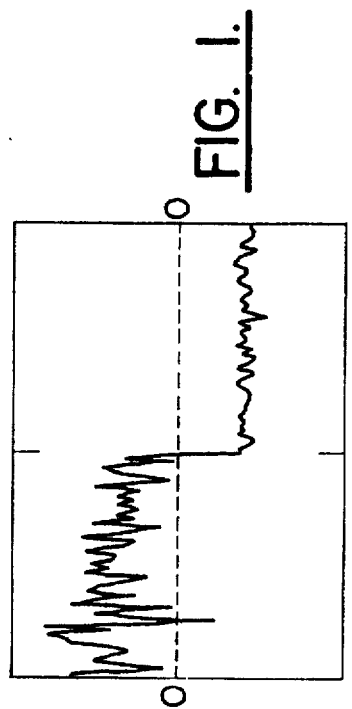
FIG. 1 illustrates an optically-transmitted Manchester encoded bit which has been detected by a conventional avalanche photodiode which was illuminated during the first half of the bit interval.

Typically, however, the light of an optical signal will intermittently illuminate the photodetector 50 and the photodetector will generate an electrical signal corresponding to the optical signal. For example, the electrical signal or pulse generated by an APD in response to an optically transmitted Manchester encoded logic "1" is shown in FIG. 1. In the example, the APD is illuminated during the first phase segment, but not during the second segment. Therefore, the first phase segment also includes significantly more noise, including signal shot noise, than the second phase segment.

For purposes of discussion, the decoding method and apparatus 10 of the present invention will be described in conjunction with Manchester encoded signals. However, the decoding method and apparatus can be employed in conjunction with other signal formats, such as signal formats which have both an illuminated portion and a dark portion and signal formats which have a known duty cycle including, but not limited to, Quaternary Phase Shift Keying (QPSK) or Quadrature Amplitude Modulation, without departing from the spirit and scope of the present invention.

Figure 2:
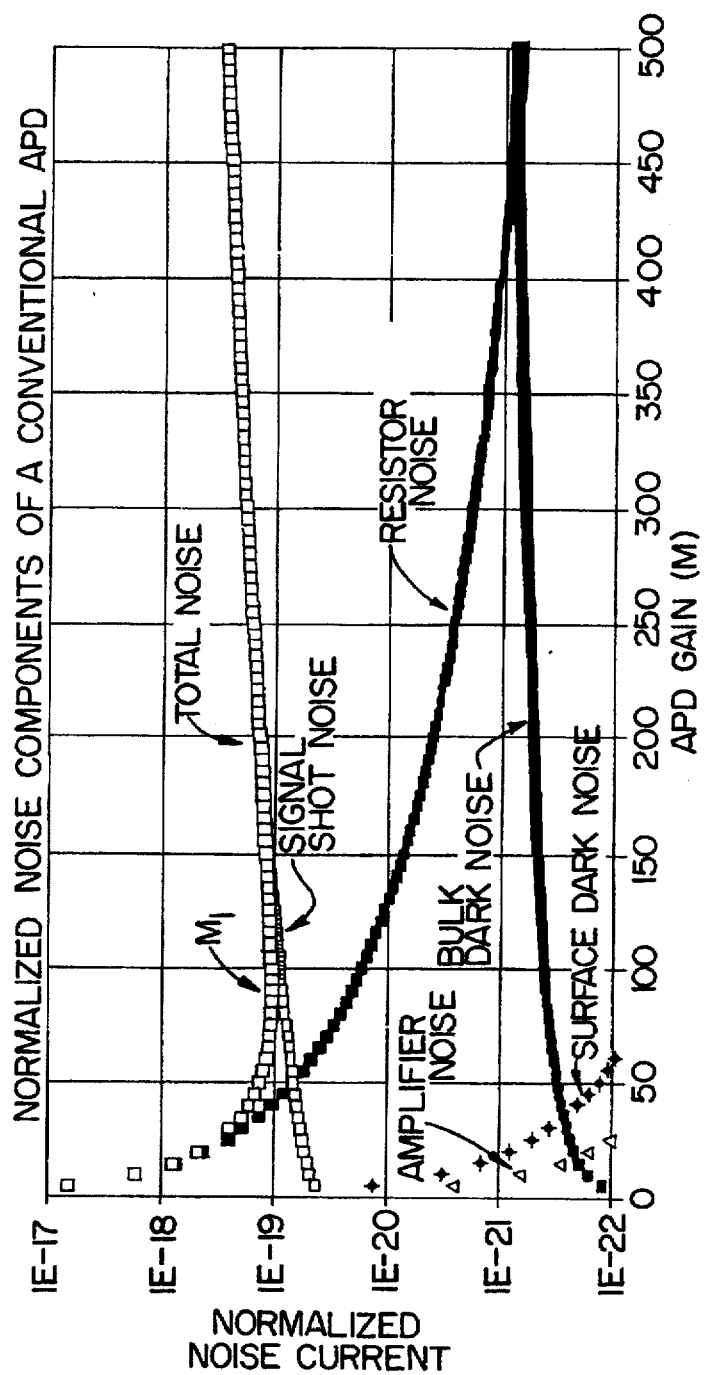
FIG. 2 is a graphical illustration of the various normalized noise components of a conventional avalanche photodiode as a function of avalanche gain M.

The electrical signal generated by an APD in response to a detected optical signal includes a variety of noise components. As shown in FIG. 2, for example, the noise portion of the electrical signal includes signal shot noise (at least during the portion of the electrical signal corresponding to a light portion), resistor noise, bulk dark noise, surface dark noise and amplifier noise. While each noise component varies differently as a function of the gain of the APD, the total noise current, as normalized by the gain of the amplifier, initially decreases up to a predetermined gain designated $M_1$ in FIG. 2 and, thereafter, steadily increases as the gain of the APD is further increased. Thus, while it is generally advantageous to increase the gain such that the APD can detect optical signals having lower intensity levels, the increasing gain of the APD also increases the noise of the resulting electrical signal. As described above, this increased noise can reduce the effectiveness of an optical decoder in discriminating between a logic 1 and a logic 0, thereby potentially increasing the bit error rate (BER) of the optical decoder.

A photodetector 50 such as an APD can be mathematically modeled based, at least in part, on the current $I_s$ produced by incident photons and the gain M of the APD. As described above and illustrated in FIG. 2, the amplification provided by the photodetector device during the illumination of the photodetector also produces signal shot noise having a power proportional to $F(M)M^2I_s$, wherein $F(M)$ is the excess noise factor. In the absence of light, the photodetector will not produce signal shot noise, but will continue to produce dark noise having a power proportional to 323 $2qF(M)M^2I_{db}$, wherein $I_{db}$ is the bulk dark current produced by carriers entering the depletion layer and q is the charge of an electron, namely, $1.602 \times 10^{-19}$ C. In addition, the noise portion of the signal produced by an APD includes a thermal noise component having a power proportional to $$\left(\frac{4kT}{R} + 2qI_d\right)$$

wherein $I_{ds}$ is the surface dark current, K is the Boltzmann constant ($1.381 \times 10^{23}$ J/molecule ·K), T is the temperature and R is the resistance associated with the current-to-voltage conversion whereby the APD current is converted to a voltage.

As a result of the contributions of the various noise components, the total power of an electrical signal generated by a photodetector is the sum of the power of the signal portions and the power of the noise portion N as shown below.:

$$S + N = M^2 \bar{I}_s^2 + \qquad (1)$$

$$2qF(M)M^2\bar{I}_sB + 2qF(M)M^2I_{db}B + \frac{4kTB}{R} + 2qI_{ds}B$$

wherein the terms from left to right represent the power of the signal portion, the signal shot noise component, the bulk dark noise component, the thermal noise component and the surface dark noise component, respectively. More particularly, B is the bandwidth of the photodetector receiver and $\bar{I}_s$ is the mean signal current.

The relative contributions of the signal and noise components is shown in FIG. 1 for a Manchester encoded logic "1" as detected by an APD. Notably, the noise portion during the first phase segment is significantly larger than the noise portion during the segment phase associated with the absence of light. This difference in noise levels is attributable to the signal shot noise term in equation 1, i.e., second term of equation 1. While the operation of the weighted-sum processing method and apparatus of the present invention will be hereinafter described, for purposes of illustration, primarily in conjunction with the decoding of a Manchester encoded logic "1", it should be apparent that the weighted-sum processing method and apparatus can also detect and decode signals formatted differently as well as a Manchester encoded logic "0" in which the first phase segment is dark and the second phase segment is illuminated.

Conventional processing of the signals produced by a photodetector, such as an APD, ignores the multiplicative nature of this noise. In contrast, the optical decoding method and apparatus 10 of the present invention advantageously adjusts the relative power levels of the first and second phase segments so as to attenuate noise portion of the first phase segment, i.e., the phase segment generated by illumination of the photodetector in this example.

While the optical decoding method and apparatus 10 of the present should not be limited in scope by its theory of operation, it is believed that the theoretical underpinnings of the present invention can be explained by rewriting equation 1 in the form of a signal-to-noise ratio (S/N or SNR) as shown in equation 2 below:

$$\frac{S}{N} = \frac{M^2\bar{I}_s^2}{2qF(M)M^2\bar{I}_sB + 2qF(M)M^2I_{db}B + \frac{4kTB}{R} + 2qI_{ds}B} \qquad (2)$$

The dependence of the numerator on M can then be eliminated by dividing both the numerator and the denominator by $M^2$ as shown in equation 3.

$$\frac{S}{N} = \frac{\bar{I}_s^2}{2qF(M)\bar{I}_sB + 2qF(M)I_{db}B + \frac{4kTB}{RM^2} + \frac{2qI_{ds}B}{M^2}} \qquad (3)$$

The contributions of each denominator term to the total normalized noise as a function of M (the gain of the photodetector) can then be graphically illustrated as shown in FIG. 2, for example. In this example, the excess noise function is defined as $F(M)=0.98(2(1/M))+0.2M$ which approximates the behavior of many silicon APD's. Other values used in this example are: $R=10$ K$\Omega$, $I_{db}=2$ pA, $I_{ds}=10$ nA, $T=300°$ K, $B=100$ MHz, $\bar{I}_s=1000$ pA, and $I_{GATE}$ (GaAsFET)=2nA which are typical values for high-quality APD's, such as the EG&G C30902S APD, and the receivers associated with such APD's. As illustrated, the signal shot noise component dominates the total noise at all but the lowest values of avalanche gain (M), i.e., at all levels of gain above about 100.

Further review of equation 2 and FIG. 2 indicates that the signal-to-noise ratio (SNR) and, therefore, the BER improves with increasing M up to the point at which the signal shot noise term (reflected by first term in denominator of equation 2) begins to dominate the noise statistics, such as above about M=100 in the illustrated example. For levels of gain above this point, the SNR of conventional optical detectors will gradually degrade with increasing levels of gain (M).

However, by analyzing the two phase segments, identifying the noisier segment and weighting at least one of the phase segments based upon the relative noise of the two phase segments, the optical decoding method and apparatus of the present invention can more reliably identify the logic level of the optically detected bit. In particular, by appropriately weighting the phase segments as described in more detail hereinbelow, the gain of the photodetector can be increased without correspondingly increasing the noise in a manner which would inhibit the decoding of an optically detected signal. Accordingly, the optical decoding method and apparatus of the present invention can advantageously detect lower level optical signals by permitting the gain of the photodetector to be increased without correspondingly increasing the contribution of the noise portion of the signal to the decoding process.

According to the optical decoding method and apparatus 10 of the present invention, the power is preferably determined for each phase segment. For example, the optical decoding apparatus can include an integrating circuit that individually computes the integral for the first phase segment and the integral for the second phase segment. For example, the integral for the first phase segment is mathematically represented below as equation 4 in which $i_r^2$ is the square of the total signal plus noise described in equation 1.

$$P_{SN1} = \int_0^{\frac{T_b}{2}} i_r^2 dt \qquad (4)$$

Although the above-described integration is preferably performed by an integrating circuit, the optical decoding apparatus 10 can include other types of summation or programming alternatives and the like as are known and routinely used by those of skill in the art for integrating a signal without departing from the spirit and scope of the present invention.

After determining the power of the respective phase segments, the optical decoding method and apparatus 10 of the present invention preferably determines and applies a weighting factor to the phase segment having the greater noise power. Of course, a weighting factor could optionally be applied to the phase segment having less noise power or to both phase segments without departing from the spirit and scope of the present invention.

One advantageous method of determining a weighting factor is to assume general operating conditions in which the noise power due to signal shot noise can be expressed as (m) times all remaining sources of noise power during the illuminated portion of the optical signal as shown in equation 5 below:

$$I^2_{NS} = m I^2_{NT} \qquad (5)$$

In this equation, $I_{NS}^2$ is the signal shot noise power (also shown as the first term in the denominator of equation 2) and $I_{NT}^2$ is the remaining noise power (second, third and fourth terms of the denominator of equation 2).

For a 50% duty-cycle signal, such as a Manchester encoded signal, the optical signal illuminates the detector for only half of the bit period. As a result, the SNR of equation 3 can be rewritten in simplified form as:

$$\frac{S}{N} = \frac{\left(\frac{1}{2} I_s\right)^2}{\frac{1}{2} N_s + N_t} \qquad (6)$$

wherein $N_s$ is the square of the signal shot noise current, $N_t$ is the square of the remaining noise currents, $I_s$ is the peak signal current (as opposed to the average or mean signal current Is of equations 1–3).

According to the optical decoding method and apparatus 10 of the present invention, the phase segment corresponding to the light portion of the optical signal is noisier and will generally be weighted by a weighting factor (x) which preferably has a value $0 \leq x \leq 1$. Thus, equation 3 can be rewritten as shown in equation 7.

$$\frac{S}{N} = \frac{\frac{I_s}{2}\left(\frac{1}{2} + \frac{x}{2}\right)}{\sqrt{\left(\frac{x}{2} I_{NS}\right)^2 + \left(\frac{x}{2} I_{NT}\right)^2 + \left(\frac{1}{2} I_{NT}\right)^2}} = \frac{\frac{I_s}{2}\left(\frac{x+1}{2}\right)}{\sqrt{\frac{x^2}{4} m I_{NT}^2 + \frac{x^2}{4} I_{NT}^2 + \frac{1}{4} I_{NT}^2}} \qquad (7)$$

wherein S/N is herein expressed as a ratio of the signal voltage to the noise voltage, while equations 3 and 7 are expressed as a ratio of the signal power to the noise power.

According to conventional optical decoding schemes in which neither phase segment is attenuated, the weighting factor x is effectively set to 1 regardless of the value of (m). By attenuating at least one of the phase segments, typically the noisier phase segment, the optical decoding method and apparatus of the present invention improves the SNR. This improvement is demonstrated by equation 8 below in which a ratio designated f(x) is computed of $$\frac{S}{N}(x)$$

to $$\frac{S}{N}(x=1); f(x) = \frac{(x+1)}{\sqrt{x^2 m + x^2 + 1}} \cdot \frac{\sqrt{m+2}}{2} \qquad (8)$$

Equation 8 can be maximized by differentiating the equation and setting the result equal to 0 as expressed by equation 9.

$$\frac{df(x)}{dx} = \qquad (9)$$

$$\sqrt{m+2} \cdot \frac{\sqrt{x^2(m+1)+1}\left(\frac{1}{2}\right) - \frac{x+1}{2}\left(\frac{1}{2}\right)[x^2(m+1)+1]^{-1/2}(m+1)2x}{x^2(m+1)+1} = 0$$

Thus, an optimum value for x which would result in an optimum improvement ($x_{opt}$) of the SNR can be determined by solving equation 9 to yield equation 10.

$$x_{opt} = \frac{1}{m+1} \qquad (10)$$

Although the preferred weighting factor is $x_{opt}$ in order to optimize the improvements in the SNR, the optical decoding method and apparatus 10 of the present invention can employ other weighting factors x without departing from the spirit and scope of the present invention. For example, a weighting factor could be selected from one of several predetermined weighing factors stored by a reference program or signal processing circuitry. The actual attenuation value or weighing factor could then be selected from among these predetermined weighting factors based upon the relative power of the noise portions of each respective phase segment. Preferably, however, an optimum weighting factor $x_{opt}$ is computed based upon a ratio of the signal shot noise to the remaining sources of noise as described above. Thereafter, the phase segment having the greatest noise, such as the first phase segment in FIG. 1, is attenuated by the weighting factor, such as by multiplying both the signal and noise portions of the respective phase segment by the weighting factor, while the other phase segment is unchanged.

In one example in which $I_{NS}^2 = I_{NT}^2$ such that m=1, the optimum weighting factor $x_{opt}$ will be ½. As a result, the resulting S/N improvement may be relatively small, such as 0.5 dB. However, the optical decoding method and apparatus of the present invention overcomes the quantum limit restraints typically imposed by conventional optical signal processing which lead to the degradation of the SNR with increasing APD gains as illustrated in FIG. 2. For example, for an APD having a gain (M) of about 500, the ratio of $I_{NS}^2$ to $I_{NT}^2$ and, therefore, the value of m, is approximately 200. Accordingly, the weighting factor, $x_{opt}$, is 1/201. By weighting the noisier phase segment of the pulse by $x_{opt}$ in this example, the SNR will improve by a factor of about 7, which translates into an 17 dB improvement. It is noted that in most practical situations such a large ratio of signal shot noise to other sources of noise (m=200) will rarely be achieved such that the exemplary 17 dB improvement will typically be on the upper end of the performance of the optical decoding method and apparatus of the present invention.

Notably, in instances in which the signal shot noise is dominant, the value (m) increases approximately in proportion to $M^2$. As supported by equation 7, however, as m>>1, the improvement in S/N asymptotically approaches the expression $\frac{1}{2}(m+2)^{1/2}$. Of course, a natural limit exists on the APD gain (M) beyond which breakdown occurs. In addition, as M becomes very large, the multiplied bulk dark current (the second term in the denominator of equation 2) will begin to dominate. Thus, by increasing the gain M beyond the point at which the multiplied bulk dark current begins to dominate the noise statistics, the SNR will again begin to degrade. Further, since the multiplied bulk dark current exists at all times, i.e., since the bulk dark current is not signal dependent, there currently is no known way to remove its effect using non-linear processing methods. Thus, the gain of the photodetector is preferably maintained at levels below which the bulk dark current dominates.

Figure 3:
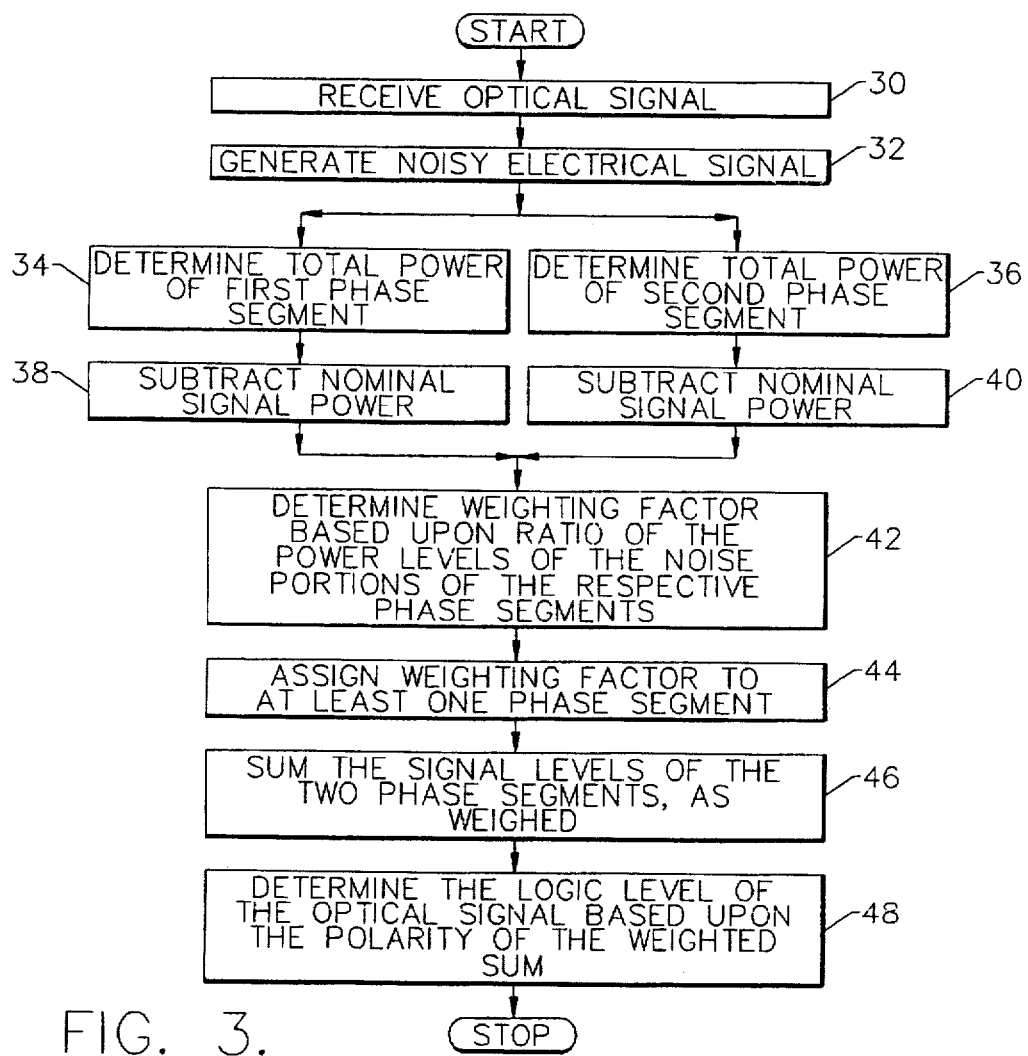
FIG. 3 is a block diagram illustrating the operations performed by the weighted-sum decoding method and apparatus of one embodiment of the present invention.
Figure 4:
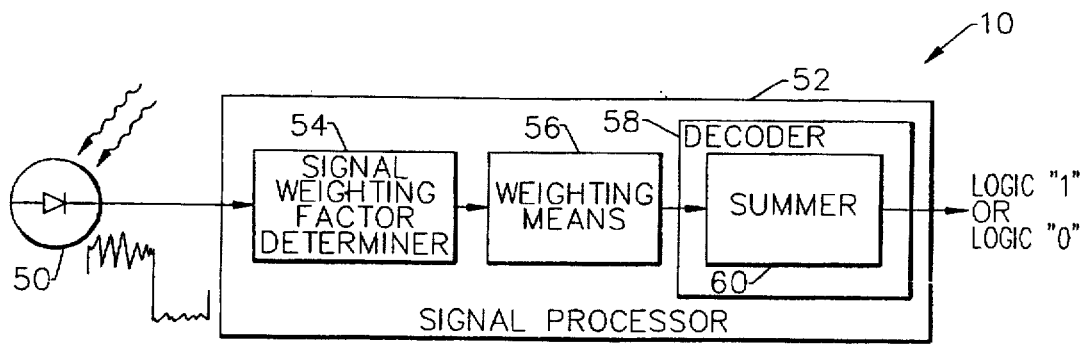
FIG. 4 is a hardware block diagram of a weighted-sum decoding apparatus of one embodiment of the present invention.

Referring now to FIG. 4, in which an optical detector 10 according to one advantageous embodiment of the present invention is illustrated, and FIG. 3 in which the operations performed by the optical detector of FIG. 4 are illustrated, the optical detector includes a photodetector 50, such as an APD, for detecting an optical signal having a light portion and a dark portion and for generating an electrical pulse in response thereto as shown in blocks 30 and 32 of FIG. 3. As described above, the electrical pulse generated by the photodetector preferably has a first phase segment generated during the illumination of the photodetector and a second phase segment generated by the photodetector in the absence of light. As also described above, each phase segment includes respective signal and noise portions as shown in FIG. 1 and schematically in FIG. 4.

The optical detector 10 also includes a signal processor 52 for decoding the electrical pulse generated by the photodetector so as to identify the optical signal detected thereby. The signal processor includes signal weighting factor determining means 54 for determining a signal weighting factor based upon the respective noise portions of the two phase segments. In particular, the signal weighting factor determining means preferably determines the power of the first phase segment and the power of the second phase segment as shown in blocks 34 and 36 of FIG. 3. In this manner, the signal weighting factor determining means can also determine the phase segment which has the greatest noise.

More particularly, the signal weighting factor determining means 54 preferably separates the signal portion of each phase segment from the noise portion such that the power levels of the respective noise portions can be individually analyzed. In order to separate the respective signal portions, the signal weighting factor determining means preferably maintains or determines a nominal power level for the signal portions which can be subtracted from each phase segment in order to isolate the respective noise portions as shown in blocks 38 and 40. The nominal power level can be determined in several fashions. For example, the nominal power level of the signal portions can be pre-selected based upon the anticipated power levels of the electrical pulses to be generated by the APD. Alternatively, the signal weighting factor determining means can determine the nominal power level of the respective signal portions by maintaining a running root mean square (RMS) average of the power level of the respective signal portions of prior electrical signals.

Once the respective noise portions of the phase segments have been isolated, the signal weighting factor determining means 54 can determine the ratio of the signal shot noise power in the noisier phase segment to the noise components of the quieter phase segment by taking the ratio of the power level of the noisier phase segment to the power level of the quieter phase segment in order to determine m. Based upon the value m determined by the signal weighting factor determining means, the signal weighting factor determining means can determine the weighting factor x and, preferably, the optimum weighting factor $x_{opt}$ as described above and as shown in block 42 of FIG. 3.

The signal processor 52 also includes a weighting means 56 for weighting at least one of the phase segments by the signal weighting factor as shown in block 44. Preferably, the weighting means weights the noisier phase segment, including both the signal portion and the noise portion of the noisier phase segment, by the weighting factor, such as by multiplying the power level of the appropriate phase segment by the weighting factor. While the weighting means preferably weights the noisier phase segment, the optical decoding method and apparatus of the present invention can weight the quieter phase segment or both phase segments if so desired without departing from the spirit and scope of the present invention.

The signal processor 52 also preferably includes a decoder 58 for identifying the optical signal based upon the first and second phase segments, as weighted by the weighting factor. Preferably, the decoder includes a summer 60 for summing the signal levels of the two phase segments, as weighted by the weighting means, to produce a weighted sum having a respective polarity. Thus, the decoder can identify the optical signal based upon the polarity of the weighted sum as shown in blocks 46 and 48 of FIG. 3.

Although the signal processor 52 can be implemented in a variety of manners without departing from the spirit and scope of the present invention, the signal processor of one embodiment of the present invention, including the signal weighting factor determining means 54, the weighting means 56 and the decoder 58, including the summer 60, are preferably implemented by a combination of hardware and software. For example, the signal processor can be implemented by a computer having one or more controllers and related memory elements which operate under the control of software to provide the requisite data calculations and decoding logic.

By weighting at least one of the phase segments based upon the power of the noise portions of the respective phase segments, the decoding method and apparatus 10 of the present invention can reliably detect and decode optical signals. In particular, the decoding method and apparatus of the present invention can reliably decode optical signals even as the gain provided by the photodetector 50, such as the gain provided by the APD, is increased, thereby allowing optical signals having lower power levels to be reliably detected and decoded.

The foregoing is illustrative of the present invention and is not to be construed as limiting thereof. The invention is defined by the following claims, with equivalents of the claims to be included therein.

That which is claimed is:

1. A method of decoding an optical signal comprising the steps of:

detecting an optical signal having a light portion and a dark portion;

generating a pulse having two phase segments in response to the detected optical signal, wherein one phase segment corresponds to the light portion of the optical signal and the other phase segment corresponds to the dark portion of the optical signal, and wherein each phase segment includes respective signal and noise portions;

determining a signal weighting factor based upon the respective noise portions of the two phase segments;

weighting at least one phase segment by the signal weighting factor; and decoding the optical signal based upon the two phase segments as weighted by the signal weighting factor.

2. A method according to claim 1 wherein said determining step comprises the steps of:
   determining a ratio of the power of the noise portion of one phase segment to the power of the noise portion of the other phase segment; and
   determining the signal weighting factor based upon the ratio of the power of the respective noise portions of the two phase segments.

3. A method according to claim 1 wherein said determining step comprises the steps of:
   determining the power of the noise portion of each respective phase segment; and
   determining the signal weighting factor such that the multiplicative product of the signal weighting factor and the power of the noise portion of one phase segment equals the power of the noise portion of the other phase segment.

4. A method according to claim 3 wherein the noise portion of the phase segment corresponding to the light portion of the optical signal includes a signal shot noise component, wherein the noise portion of the phase segment corresponding to the dark portion of the optical signal includes a resistor noise component and dark noise components, and wherein said signal weighting factor determining step comprises determining the signal weighting factor such that the multiplicative product of the signal weighting factor and the power generated by the signal shot noise component equals the power generated by the resistor noise component and the dark noise components.

5. A method according to claim 3 wherein the signal weighting factor is no less than 0 and no greater than 1, and wherein said weighting step comprises weighting the phase segment which has the noise portion with the greatest power.

6. A method according to claim 1 wherein said generating step comprises amplifying the pulse generated in response to the detected optical signal.

7. A method according to claim 1 wherein said decoding step comprises the steps of:
   summing the two phase segments as weighted by the signal weighting factor to produce a weighted sum having a respective polarity; and
   identifying the optical signal based upon the polarity of the weighted sum.

8. A method of decoding optical signals comprising the steps of:
   detecting an optical signal having a light portion and a dark portion;
   generating a pulse having two phase segments in response to the detected optical signals, wherein one phase segment corresponds to the light portion of the optical signal and the other phase segment corresponds to the dark portion of the optical signal, and wherein each phase segment includes respective signal and noise portions;
   determining a signal weighting factor of less than 1 based upon the respective noise portions of the two phase segments;
   weighting the phase segment which has the noise portion with the greatest power by the signal weighting factor; and
   decoding the optical signal based upon the two phase segments as weighted by the signal weighting factor.

9. A method according to claim 8 wherein said determining step comprises the steps of:
   determining a ratio of the power of the noise portion of one phase segment to the power of the noise portion of the other phase segment; and
   determining the signal weighting factor based upon the ratio of the power of the respective noise portions of the two phase segments.

10. A method according to claim 8 wherein said determining step comprises the steps of:
    determining the power of the noise portion of each respective phase segment; and
    determining the signal weighting factor such that the multiplicative product of the signal weighting factor and the power of the noise portion of one phase segment equals the power of the noise portion of the other phase segment.

11. A method according to claim 10 wherein the noise portion of the phase segment corresponding to the light portion of the optical signal includes a signal shot noise component, wherein the noise portion of the phase segment corresponding to the dark portion of the optical signal includes a resistor noise component and dark noise components, and wherein said signal weighting factor determining step comprises determining the signal weighting factor such that the multiplicative product of the signal weighting factor and the power generated by the signal shot noise component equals the power generated by the resistor noise component and the dark noise components.

12. A method according to claim 8 wherein said generating step comprises amplifying the pulse generated in response to the detected optical signal.

13. A method according to claim 8 wherein said decoding step comprises the steps of:
    summing the two phase segments as weighted by the signal weighting factor to produce a weighted sum having a respective polarity; and
    identifying the optical signal based upon the polarity of the weighted sum.

14. An optical detector for detecting and decoding an optical signal, said detector comprising:
    a photodetector for generating an electrical pulse in response to illumination thereof, wherein the electrical pulse has one phase segment generated during illumination of said photodetector, and another phase segment generated by said photodetector in the absence of light, and wherein each phase segment includes respective signal and noise portions;
    signal weighting factor determining means, responsive to said photodetector, for determining a signal weighting factor based upon the respective noise portions of the two phase segments;
    weighting means, responsive to said signal weighting factor determining means, for weighting the phase segment generated during illumination of said photodetector by the signal weighting factor; and
    a decoder, responsive to said weighting means, for identifying the optical signal based upon the two phase segments as weighted by signal weighing factor.

15. An optical detector according to claim 14 wherein said photodetector includes at least one avalanche photodiode.

16. An optical detector according to claim 14 wherein said signal weighting factor determining means comprises power determining means for determining the power of the respective noise portions of the two phase segments.

17. An optical detector according to claim 16 wherein said signal weighting factor determining means determines the signal weighting factor based upon a ratio of the power of the respective noise portions of the two phase segments.

18. An optical detector according to claim 16 wherein said signal weighting factor determining means determines the signal weighting factor such that the multiplicative product of the signal weighting factor and the power of the noise portion of the phase segment generated during illumination of said photodetector equals the power of the noise portion of the phase segment generated by said photodetector in the absence of light.

19. An optical detector according to claim 14 wherein said decoder comprises a summer for summing the phase segment generated during illumination of said photodetector, as weighted by said weighting means, and the phase segment generated by said photodetector in the absence of light to produce a weighted sum having a respective polarity such that said decoder can identify the optical signal based upon the polarity of the weighted sum.

* * * * *